No. 656,547. Patented Aug. 21, 1900.
E. HUDSON.
PAN LIFTER.
(Application filed Apr. 30, 1898. Renewed June 8, 1900.)
(No Model.)
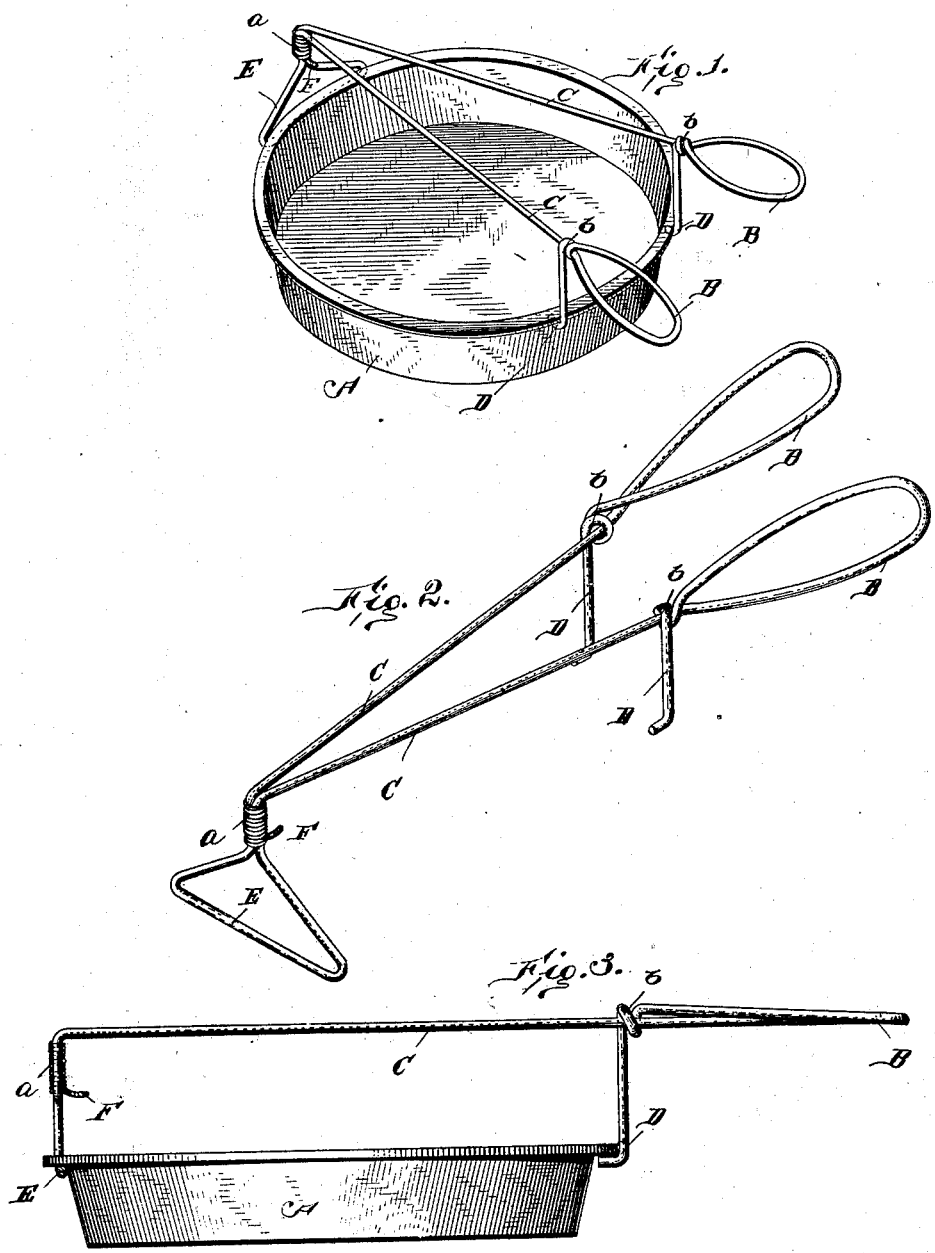
WITNESSES:
H. C. Barry
INVENTOR
E. Hudson
BY O. E. Duffy
ATTORNEY.

UNITED STATES PATENT OFFICE.

EDWIN HUDSON, OF AGOSTA, OHIO.

PAN-LIFTER.

SPECIFICATION forming part of Letters Patent No. 656,547, dated August 21, 1900.

Application filed April 30, 1898. Renewed June 8, 1900. Serial No. 19,633. (No model.)

*To all whom it may concern:*

Be it known that I, EDWIN HUDSON, of Agosta, in the county of Marion and State of Ohio, have invented certain new and useful Improvements in Pan-Lifters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to articles used in connection with culinary vessels, and has for one object to provide a handle for lifting pans or other vessels when hot or in a heated condition.

A further object of the invention is to produce a handle neat, cheap, and efficient in use and adjustable to a certain extent, to lift different-sized vessels and of different contour.

The invention consists in making pan-lifters for culinary vessels, as hereinafter more fully described, and particularly pointed out in the claims.

In the drawings, Figure 1 is a perspective view of a pan with the handle or tool attached thereto, also showing the handle in position in perspective. Fig. 2 shows a perspective view of the handle ready for use; Fig. 3, a side elevation, partly in section.

The same letters will indicate like parts in all the figures, in which—

A is a round pan, and B B the handle.

C C are stems connecting the lifters.

D D are the front lifters, and E the rear lifter.

F is a lifter to be used when a square pan is to be lifted from the stove or other place.

The tool or handle is made out of a single piece of wire as follows, (except the small piece of wire which wraps and holds the wire at the bent end:) Take a piece of wire of suitable length—say about four feet long—and bend it in the middle to form a loop, as at F, sufficiently long and wide to fit over the rimmed edge of a round pan, as at E', Fig. 1. Then wrap the free ends by a short piece of wire, as shown at $a$, one end of said wire $a$ being bent inwardly at F, which also forms a lifter for a flat or square-sided pan. The free ends C C are bent backwardly on themselves, which form handles B B. Then they are twisted around the stem C C, forming a knot or fastening, as at $b\ b$. The free ends are then bent downward and backward, as shown at D D. These parts D D form legs for the instrument or tool and lifters for the pan, so that it will be observed that the wire is first bent to form a loop. Then the loop is bent to about right angles to the stems and the stems wound and secured together. Then the wire is again bent to form loops for handles and around itself, by which it is secured, and then the free ends are bent downwardly in a vertical position and then horizontally and inwardly, as at D D, to form, in conjunction with loop E, a lifter and with projection F when a square or flat-sided pan is to be lifted.

The operation of the device is as follows: When a round pan is to be lifted, the loop E is put over the rim of the pan at one side, and the lifters D D are put under the rim of the pan on the opposite side. The handles are then grasped and the pan raised to be placed in any desired location. When a square pan is to be lifted, the hook or projection F takes the place of the loop under the rim and the hooks D D on opposite sides of the rim of the pan. The pan is then readily raised. The loop E and the hook or projection F never interfere with each other in operation. As before stated, the hook F is merely the free end of the wire which wraps the main wire that forms the loop, and therefore is readily made without additional cost. When the lifter is to be used on different-sized pans, the wire handles are spread or closed together, as the case may be. The spreading of the wire handles apart shortens or lengthens the distance between the lifting-points, thus making it adjustable.

It is evident that modifications may be made without departing from the spirit of my invention, and I do not therefore desire to be confined to the exact form shown.

Having thus described my invention, what I claim as new, and desire to secure by Letters Patent, is—

1. A pan-lifter made from a piece of wire bent to form an elongated loop E, with stems, vertically disposed, and adapted to receive a segment of the rim of a pan, means to secure said stems of the wire together immediately above the loop, said stems being bent at substantially a slight angle to the loop and diverging rearwardly therefrom, and the end portion of each stem bent to form a looped handhold B, then around the stem at the inner end of the handhold and extending downwardly at substantially a right angle to the stem and then inwardly to form the lifting-hooks D, substantially as, and for the purpose specified.

2. A pan-lifter made from a piece of wire bent to form the vertically-disposed, elongated loop E, the rearwardly-diverging stems C, leading from the loop at substantially right angles thereto, the loop-shaped handholds at the rear ends of the stems, and the lifting-hooks D, projecting downwardly from the inner ends of the handholds, combined with a wrapping-wire coiled around the two stems of the wire immediately above the loop E, one end of said wrapping-wire projecting toward the lifting-hooks D, and forming a supplemental lifting-hook, substantially as, and for the purpose specified.

In testimony that I claim the foregoing as my own I affix my signature in presence of two witnesses.

EDWIN HUDSON. [L. S.]

Witnesses:
E. F. GRIM,
W. L. PAYNE.